United States Patent

Metz et al.

[11] Patent Number: 5,910,577
[45] Date of Patent: Jun. 8, 1999

[54] QUINOXALINE-MONOAZO-ACETARYLIDE PIGMENT

[75] Inventors: Hans Joachim Metz, Darmstadt; Joachim Weber, Frankfurt, both of Germany

[73] Assignee: Clariant GmbH, Frankfurt, Germany

[21] Appl. No.: 09/127,136

[22] Filed: Jul. 31, 1998

[30] Foreign Application Priority Data

Aug. 1, 1997 [DE] Germany .......... 197 33 307

[51] Int. Cl.$^6$ .......... C09B 29/33; C09B 67/20; C09D 11/00; C08K 5/3465
[52] U.S. Cl. .......... 534/742; 534/575; 534/582; 534/887; 106/31.6; 106/496; 524/92
[58] Field of Search .......... 534/742, 575; 106/31.6, 496; 524/92

[56] References Cited

U.S. PATENT DOCUMENTS 4,312,807  1/1982  Fuchs ......... 534/740

FOREIGN PATENT DOCUMENTS 2821347  11/1978  Germany ......... 534/742

*Primary Examiner*—Fiona T. Powers
*Attorney, Agent, or Firm*—Susan S. Jackson

[57] ABSTRACT

Compounds of the formula (I)

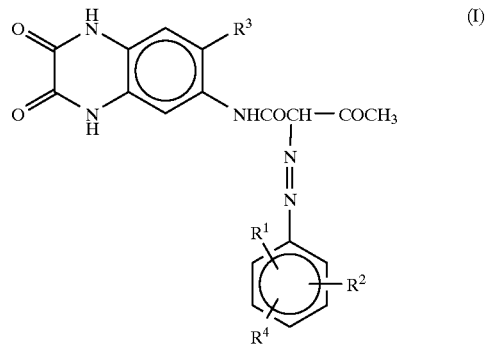

in which
$R^1$ and $R^2$ are identical or different and are Cl, COO($C_1$–$C_4$)-alkyl, $CONH_2$, $CONCH_3$, $CON(CH_3)_2$ or $SO_2NRR'$, where R and R' are identical or different and are hydrogen, $C_1$–$C_4$-alkyl or phenyl, it being possible for phenyl to be substituted by methyl, ethyl, methoxy, ethoxy or halogen, $R^3$ is hydrogen, methyl, methoxy, ethoxy, chloro or bromo, and $R^4$ is hydrogen, $C_1$–$C_3$-alkyl, chloro or bromo, are useful yellow pigments with high light fastness and weather fastness properties.

10 Claims, No Drawings

QUINOXALINE-MONOAZO-ACETARYLIDE PIGMENT

The present invention is described in the German priority application No. 197 33 307.9, filed Jan. 8, 1997, which is hereby incorporated by reference as is fully disclosed herein.

The present invention relates to novel monoazo pigments with acetoacetylamino-2,3-dioxo-1,2,3,4-tetrahydroquinoxaline as coupling component.

BACKGROUND OF THE INVENTION

DE-A1-28 00 765 discloses monoazo pigments with acetoacetylamino-2,3-dioxo-1,2,3,4-tetrahydroquinoxaline as coupling component and with phenoxycarbonylsubstituted aniline as diazo component; however, these pigments have drawbacks in terms of fastness to light and weathering.

SUMMARY OF THE INVENTION

It is an object of the present invention to provide novel azo pigments with a yellow hue which possess greater light and weather fastness than the yellow azo pigments known to date.

It has been found that this object is achieved, surprisingly, by azo pigments of the formula (I) below.

DESCRIPTION OF THE PREFERRED EMBODIMENTS

The present invention provides compounds of the formula (I)

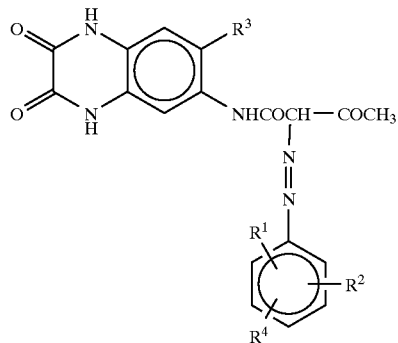
(I)

in which
- $R^1$ and $R^2$ are identical or different and are Cl, COO($C_1$–$C_4$)-alkyl, $CONH_2$, $CONCH_3$, $CON(CH_3)_2$ or $SO_2NRR'$, where R and R' are identical or different and are hydrogen, $C_1$–$C_4$-alkyl, especially methyl and ethyl, or phenyl, it being possible for phenyl to be substituted by methyl, ethyl, methoxy, ethoxy or halogen,
- $R^3$ is hydrogen, methyl, methoxy, ethoxy, chloro or bromo, and
- $R^4$ is hydrogen, $C_1$–$C_3$-alkyl, chloro or bromo.

Preferred compounds are those of the formulae (Ia), (Ib) and (Ic)

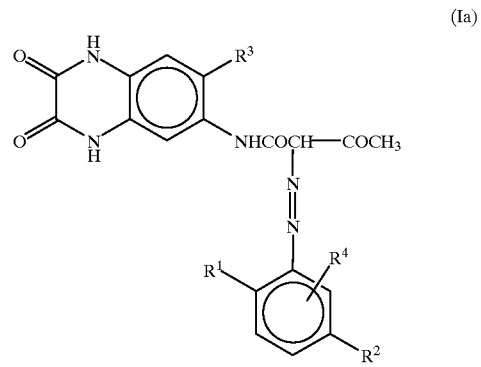
(Ia)

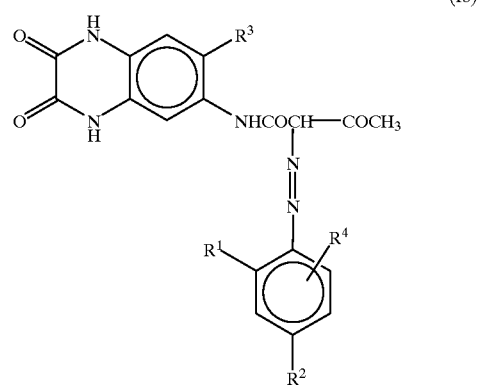
(Ib)

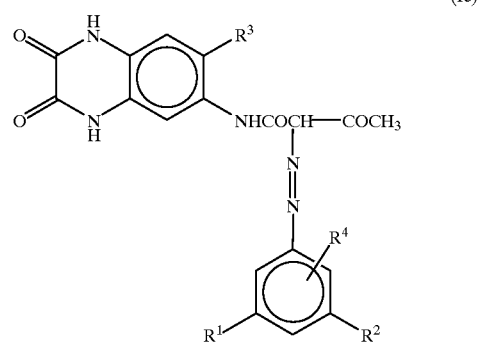
(Ic)

in which the radicals $R^1$ and $R^2$ are $COOCH_3$ or $COOC_2H_5$,
$R^3$ is hydrogen, methyl, methoxy or chloro, and
$R^4$ is hydrogen or methyl.

Particularly preferred for the purposes of the invention is the pigment of the formula (Id)

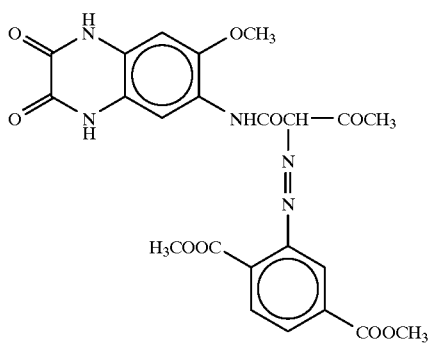

The formulae (I) and (Ia) to (Id) are to be understood as idealized formulae and also embrace the corresponding tautomeric compounds and also the possible configurational isomers of each tautomeric form. In solids, the compounds of said formulae are normally in the hydrazone form. The formulae hence also embrace the hydrazone form.

The present invention also provides a process for preparing the novel compounds of the formula (I), which comprises diazotizing an amine of the formula (II)

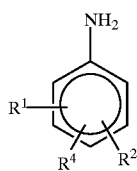

in which $R^1$, $R^2$ and $R^4$ are as defined for formula (I) and coupling the product in a molar ratio of 1:0.9 to 1.1, preferably 1:0.95 to 1.05, with a compound of the formula (III)

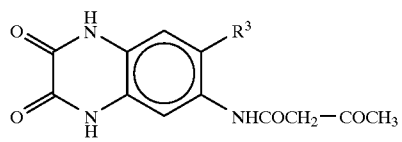

in which $R^3$ is as defined for formula (I).

The formula (III) is to be understood as an idealized formula which also embraces the corresponding tautomeric compounds and also the possible configurational isomers of each tautomeric form.

Examples of suitable amines of the formula (II) are dimethyl aminoterephthalate, diethyl aminoterephthalate, dimethyl aminoisophthalate, aminoterephthalic acid monomethyl ester mono-N-methylamide, aminoterephthalic acid monomethyl ester monoamide and 2,5-dichloroaniline. The preparation of such compounds is described in the literature and is common knowledge to the person skilled in the art.

Examples of suitable coupling components of the formula (III) are N-acetoacetyl-6-methoxy-7-aminoquinoxaline-2,3-dione, N-acetoacetyl-6-methyl-7-aminoquinoxaline-2,3-dione, N-acetoacetyl-6-chloro-7-amino-quinoxaline-2,3-dione, N-acetoacetyl-7-aminoquinoxaline-2,3-dione and N-acetoacetyl-6-ethoxy-7-aminoquinoxaline-2,3-dione.

Compounds of this kind are described in the literature: for example, in EP-A-0 010 722.

The novel compounds of the formula (I) are prepared by coupling the diazotized amines with the stated coupling components in an aqueous medium, in the presence or absence of nonionic, anionic or cationic surface-active substances which may have a clouding point in aqueous medium. It is also possible if desired to use further auxiliaries, such as natural or synthetic resins or resin derivatives, or customary paint, printing-ink or polymer additives. Coupling can also take place, in whole or in part, in organic solvents.

The coupling reaction can be carried out in an aqueous medium by
 a) adding a solution of the diazonium salt to a buffered suspension or dispersion of the coupling component, or
 b) metering a solution of the diazonium salt and a solution, suspension or dispersion of the coupling component into a buffer solution or into a mixing nozzle, simultaneously, or
 c) adding a solution of the coupling component to a buffered solution of the diazonium salt, or
 d) adding a buffered suspension or dispersion of the coupling component to a solution of the diazonium salt.

In general, the coupling reaction is carried out at temperatures between 0 and 40° C. The pH can be from 4 to 6. In the process of the invention, method a is particularly advantageous.

The novel compounds of the formula (I) are useful water-insoluble colorants and, following the coupling reaction, can be isolated in a customary manner. It is often judicious, in order to achieve the full color strength and a particularly favorable crystal structure, to subject the azo pigments obtained after the coupling reaction to an after treatment (finish). For this purpose, for example, the moist or dried pigments can be heated in organic solvents, such as in tertiary acid amides, such as N-methyl-2-pyrrolidone, dimethylformamide, dimethylacetamide, urea derivatives, such as tetramethylurea,

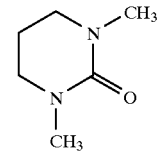

or in dipolar aprotic solvents, such as dimethyl sulfoxide or sulfolane, for a certain period, such as from 30 minutes to 3 hours, under atmospheric or elevated pressure, judiciously at from 40 to 250° C., preferably at from 100 to 170° C.

The novel compounds of the formula (I) are particularly suitable for pigmenting high molecular mass organic materials. Examples of high molecular mass organic materials are cellulose ethers and cellulose esters, such as ethylcellulose, nitrocellulose, cellulose acetate, cellulose butyrate, natural resins or synthetic resins, such as addition polymerization resins or condensation resins, examples being amino resins, especially urea- and melamine-formaldehyde resins, alkyd resins, acrylic resins, phenolic resins, polycarbonates, polystyrene, polyvinyl compounds, especially polyvinyl chloride or polyvinyl acetate, polyolefins, especially polyethylene and polypropylene, polyacrylic compounds, especially polyacrylonitrile and polyacrylates, polyesters, rubber, casein, silicone and silicone resins, individually or in mixtures. Polyolefins, such as polyethylene and polypropylene, are particularly preferred as the medium.

In this context it is unimportant whether the above mentioned high molecular mass organic compounds are in the form of plastic masses or melts or in the form of spinning solutions, or are contained in paints, other coating materials or printing inks. Depending on the intended application it may prove advantageous to use the pigments obtained in accordance with the invention as toners or in the form of preparations or dispersions. Based on the high molecular mass organic material to be pigmented, the novel pigments are employed in an amount of preferably from 0.1 to 10% by weight.

The novel compounds of the formula (I) are notable for particularly good temperature stability, dispersibility and color strength, but especially for outstanding light and weather fastness and fastness to overprinting in aqueous basecoats. For this reason, they are particularly suitable for pigmenting aqueous automotive OEM finishes.

The water-insoluble compounds of the formula (I) prepared in accordance with the invention are suitable for use as colorants in electrophotographic toners and developers, such as one- or two-component powder toners (also called one- or two-component developers), magnetic toners, liquid toners, polymerization toners and specialty toners (literature: L. B. Schein, "Electrophotography and Development Physics"; Springer Series in Electrophysics 14, Springer Verlag, 2nd Edition, 1992).

Typical toner binders are addition polymerization, polyaddition and polycondensation resins, such as styrene, styrene acrylate, styrene-butadiene, acrylate, polyester, phenol and epoxy resins, polysulfones, polyurethanes, individually or in combination, and also polyethylene and polypropylene, which may include or be modified subsequently with further ingredients, such as charge control agents, waxes or flow auxiliaries.

The water-insoluble compounds of the formula (I) prepared in accordance with the invention are suitable, moreover, for use as colorants in powders and powder coatings, especially in triboelectrically or electrokinetically sprayable powder coatings which are used to coat the surfaces of articles made, for example, from metal, wood, plastic, glass, ceramic, concrete, textile material, paper or rubber (J. F. Hughes, "Electrostatics Powder Coating" Research Studies, John Wiley & Sons, 1984).

Powder coating resins employed are typically epoxy resins, carboxyl- and hydroxyl- containing polyester resins, polyurethane resins and acrylic resins together with customary curing agents. Resin combinations are also employed. For example, epoxy resins are frequently used in combination with carboxyl- and hydroxyl- containing polyester resins. Typical curing components (depending on the resin system) are, for example, acid anhydrides, imidazoles and also dicyandiamide and derivatives thereof, blocked isocyanates, bisacylurethanes, phenolic resins and melamine resins, triglycidyl isocyanurates, oxazolines and dicarboxylic acids.

The water-insoluble compounds of the formula (I) prepared in accordance with the invention are also suitable as colorants in inkjet inks, both aqueous and nonaqueous, and in inks which operate by the hotmelt technique.

To evaluate the properties in the coatings sector of the pigments prepared in accordance with the invention a selection was made, from the large number of known coating materials, of an alkyd-melamine resin lacquer (AM) containing aromatic components and based on a medium-oil nondrying alkyd resin.

To evaluate the properties in the plastics sector of the pigments prepared in accordance with the invention a selection was made, from the large number of known plastics, of flexible polyvinyl chloride and polyethylene.

To evaluate the properties in the printing sector of the pigments prepared in accordance with the invention a selection was made, from the large number of known printing systems, of an alkyd resin-based offset printing system.

To evaluate the properties in the toner sector of the pigments prepared in accordance with the invention a selection was made, from the large number of known toner systems, of a polyester resin-based toner system.

In the Examples which follow parts and percentages are by weight.

EXAMPLE 1

Dimethyl 2-[2-oxo-1-(1,2,3,4-tetrahydro-2,3-dioxo-6-methoxyquinoxalin-7-ylcarbamoyl)propylazo]terephthalate 0.1 mol of dimethyl aminoterephthalate hydrochloride is diazotized with sodium nitrite at from 0 to 10° C. The clarified diazonium salt solution is added dropwise at room temperature over 1 hour to an acetate-buffered suspension of 0.1 mol of N-acetoacetyl-6-methoxy-7-aminoquinoxaline-2, 3-dione in the presence of a sufactant, such as ®LUTENSOL AT 25. When coupling is at an end the mixture is heated to 96° C.and the product is filtered and washed free of salt. The moist presscake is suspended in N-methylpyrrolidone, the water is removed by distillation and the product is subsequently heated at from 100 to 170° C. It is then cooled to 70° C., filtered, dried and milled. This gives 51 g of a yellow pigment.

EXAMPLES 2 to 14

The compounds of Examples 2 to 14 (see Tables 1, 2 and 3) are prepared analogously.

TABLE 1

| | Compound of the formula (Ia) | | | |
|---|---|---|---|---|
| Example | $R^1$ | $R^2$ | $R^3$ | $R^4$ |
| 2 | COOCH$_3$ | COOCH$_3$ | H | H |
| 3 | COOCH$_3$ | COOCH$_3$ | Cl | H |
| 4 | COOCH$_3$ | COOCH$_3$ | CH$_3$ | H |
| 5 | COOCH$_3$ | CONCH$_3$ | OCH$_3$ | H |
| 6 | COOCH$_3$ | CONH$_2$ | OCH$_3$ | H |
| 7 | Cl | Cl | OCH$_3$ | H |

TABLE 2

| | Compound of the formula (Ib) | | | |
|---|---|---|---|---|
| Example | $R^1$ | $R^2$ | $R^3$ | $R^4$ |
| 8 | COOCH$_3$ | COOCH$_3$ | H | H |
| 9 | COOCH$_3$ | COOCH$_3$ | CH$_3$ | H |
| 10 | COOCH$_3$ | COOCH$_3$ | Cl | H |
| 11 | COOCH$_3$ | COOCH$_3$ | OCH$_3$ | H |

TABLE 3

| | Compound of the formula (Ib) | | | |
|---|---|---|---|---|
| Example | $R^1$ | $R^2$ | $R^3$ | $R^4$ |
| 12 | COOCH$_3$ | COOCH$_3$ | OCH$_3$ | H |
| 13 | COOCH$_3$ | COOCH$_3$ | Cl | H |
| 14 | COOCH$_3$ | COOCH$_3$ | CH$_3$ | H |

EXAMPLE 15

0.5 mol of dimethyl aminoterephthalate in 400 ml of water and 150 ml of 31% strength by weight HCl is diazotized with 90.5 g of Na nitrite solution (40%) at from 0 to 10° C. and the mixture is subsequently stirred for 1 h. The excess of nitrite is removed using sulfamic acid. The clarified diazonium salt solution is added dropwise at room temperature over the course of 30 minutes to an acetate-buffered suspension of 0.5 mol of N-acetoacetyl-6-ethoxy-7-aminoquinoxaline-2,3-dione in the presence of a surfactant, such as ®GENAPOL T 250. When coupling is at an end the product is heated to 96° C., filtered and washed free of salt. The moist presscake is suspended in N-methylpyrrolidone, the water is removed by distillation, and the product is subsequently heated at 160° C. for 2 hours. Then it is filtered at 70° C., dried and milled. This gives a yellow pigment of the formula

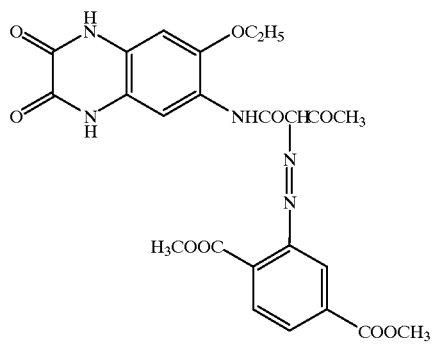

The pigments obtained from Examples 1 to 15 are dispersed by standard methods in an aqueous basecoat and are subjected to a customary test for determining the fastness to overprinting, using a white paint. The lacquer coating exhibits excellent fastness to overprinting.

We claim:

1. A compound of the formula (I)

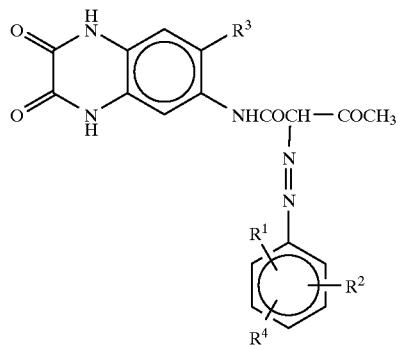

in which

R$^1$ and R$^2$ are identical or different and are Cl, COO(C$_1$–C$_4$)-alkyl, CONH$_2$, CONCH$_3$, CON(CH$_3$)$_2$ or SO$_2$NRR', where R and R' are identical or different and are hydrogen, C$_1$–C$_4$-alkyl or phenyl, it being possible for phenyl to be substituted by methyl, ethyl, methoxy, ethoxy or halogen, R$^3$ is hydrogen, methyl, methoxy, ethoxy, chloro or bromo, and R$^4$ is hydrogen, C$_1$–C$_3$-alkyl, chloro or bromo.

2. A compound as claimed in claim 1 of the formula (Ia), (Ib) or (Ic)

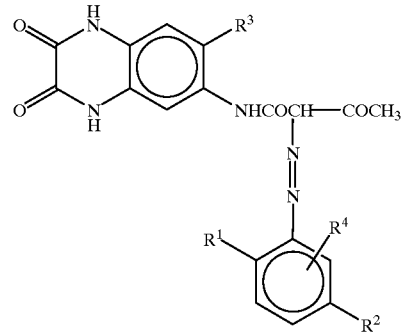

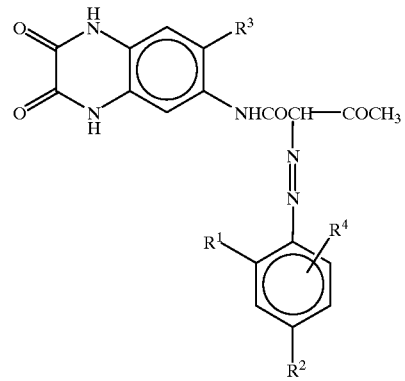

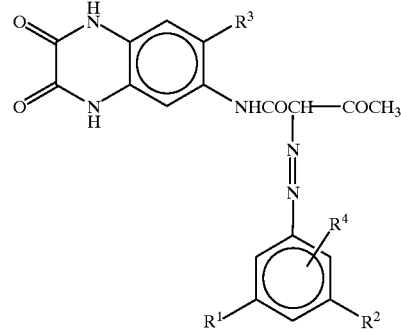

in which the radicals R$^1$ and R$^2$ are COOCH$_3$ or COOC$_2$H$_5$,

R$^3$ is hydrogen, methyl, methoxy or chloro, and

R$^4$ is hydrogen or methyl.

3. A compound of the formula (Id)

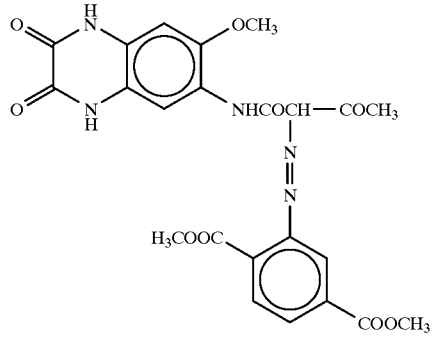
(Id)

4. A process for preparing a compound of the formula (I) as claimed in claim 1, which comprises diazotizing an amine of the formula (II)

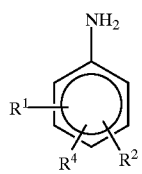
(II)

in which $R^1$, $R^2$ and $R^4$ are as defined for formula (I) and coupling the product in a molar ratio of 1:0.9 to 1.1, with a compound of the formula (III)

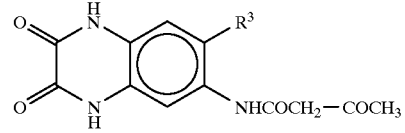
(III)

in which $R^3$ is as defined for formula (I).

5. The process as claimed in claim 4, wherein coupling is followed by a solvent finish in a dipolar aprotic solvent.

6. The process as claimed in claim 5, wherein the dipolar aprotic solvent is a tertiary acid amide.

7. The process as claimed in claim 5, wherein the solvent finish is carried out in N-methylpyrrolidone, dimethylformamide, dimethylacetamide, tetramethylurea,

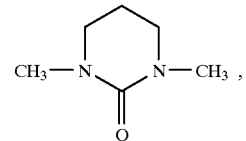

dimethyl sulfoxide or sulfolane.

8. The process as claimed in claim 5, wherein the solvent finish is carried out at a temperature from 100 to 170° C.

9. A method of pigmenting high molecular mass organic materials, paints, other coating materials, printing inks, electrophotographic toners and developers, triboelectrically or electrokinetically sprayable powders and powder coatings, and inks, comprising the step of adding a compound of the formula (I) as claimed in claim 1 to said high molecular mass organic materials, paints, other coating materials, printing inks, electrophotographic toners and developers, triboelectrically or electrokinetically sprayable powders and powder coatings, and inks.

10. The method as claimed in claim 9, wherein the high molecular mass organic medium is an aqueous automotive OEM finish.

* * * * *